United States Patent
Roth et al.

(10) Patent No.: US 12,380,291 B2
(45) Date of Patent: Aug. 5, 2025

(54) SYSTEMS CONTAINING MULTIPLE READ ZONES AND METHODS OF USE THEREOF

(71) Applicant: Avery Dennison Retail Information Services LLC, Mentor, OH (US)

(72) Inventors: Mark Roth, North Miami, FL (US); Curtis T. Stackable, Clawson, MI (US); Frederick Bleckmann, Barrington, NH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/249,985

(22) PCT Filed: Oct. 22, 2021

(86) PCT No.: PCT/US2021/056176
§ 371 (c)(1),
(2) Date: Apr. 21, 2023

(87) PCT Pub. No.: WO2022/087356
PCT Pub. Date: Apr. 28, 2022

(65) Prior Publication Data
US 2023/0394254 A1    Dec. 7, 2023

Related U.S. Application Data

(60) Provisional application No. 63/104,664, filed on Oct. 23, 2020.

(51) Int. Cl.
*G06K 7/10* (2006.01)
(52) U.S. Cl.
CPC ..... *G06K 7/10237* (2013.01); *G06K 7/10356* (2013.01); *G06K 7/10445* (2013.01)

(58) Field of Classification Search
CPC ........... G06K 7/10237; G06K 7/10356; G06K 7/10445; G06K 7/10475; G06K 7/10366;
(Continued)

(56) References Cited

U.S. PATENT DOCUMENTS 6,040,774 A    3/2000  Schepps
7,640,185 B1 * 12/2009 Giordano ............. G07G 1/0036
                                                   705/1.1
(Continued)

FOREIGN PATENT DOCUMENTS

JP    2004-21412    1/2004
JP    2007-241926   9/2007
(Continued)

OTHER PUBLICATIONS

International Search Report and Written Opinion dated Jan. 31, 2022 issued in corresponding IA No. PCT/US2021/056182 filed Oct. 22, 2021.
(Continued)

*Primary Examiner* — Dionne Pendleton (57) ABSTRACT

Systems and methods of using multiple read area zones to generate more accurate item-level data are described herein. In some embodiments, the systems and methods involve a local read area in combination with a wide read area. In some embodiments, a local area read device alone, or in combination with a wide area read device, is used to detect the removal or return of a product from a merchandising location or area in retail establishment. In some embodiments, a local area read alone, or in combination with a wide area read device, is used to detect the removal or return of a product from a merchandising location or area in retail establishment by detecting/reading a digital trigger on the product.

16 Claims, 7 Drawing Sheets

(58) Field of Classification Search
CPC ....... G06K 19/06028; G06K 19/06112; G06K 19/06121; G06K 19/0716; G06K 19/07718; G06K 19/0772; G06K 7/0008; G06K 7/10297; G06K 7/10306; G06K 7/1417; G06K 7/10108; G06K 7/10316; G06K 17/0022; G06K 7/10336; G06K 7/10415; H04W 4/023; H04W 4/027; H04W 4/029; H04W 4/08; H04W 4/80; H04W 84/12; H04W 84/18; H04W 88/10; H04W 92/02; H04L 12/66; H04B 5/77; G07G 1/0036; G07G 1/009; G07G 1/0045; G07F 13/025; G07F 9/026; G07F 9/10; G06V 10/145; G06V 10/764; G06V 10/809; G06V 10/82; G06V 20/64; G06T 7/38; G06T 7/557; G06T 7/593; G06T 7/62; G06T 7/97; G06Q 20/105; G06Q 20/204; G06Q 20/208; G06Q 20/321; G06Q 20/322; G06Q 20/3278; G06Q 30/00; G06Q 30/0207; G06Q 30/0238; G06Q 30/06; G06Q 10/087; G06Q 20/18; G06Q 20/203; G01S 13/758; G01S 13/825; G06N 3/04; G01N 27/041; G01N 33/0054; G01N 33/02; G01N 33/12; G01N 33/4977; B01L 2300/022; B01L 2300/0645; B01L 2300/0816; B01L 2300/16; B01L 3/502715; A63B 71/0619; H01Q 1/2216; H01Q 7/00; G08B 13/2462; G08B 13/2474; H04Q 2213/13095; Y10T 70/581; Y10T 70/5854; G07C 9/28; G07C 9/29

See application file for complete search history.

(56) References Cited

U.S. PATENT DOCUMENTS

| | | | |
|---|---|---|---|
| 7,837,103 B2 | 11/2010 | Suto | |
| 7,924,161 B1* | 4/2011 | Spindel | G06K 7/0008 340/573.1 |
| 7,932,830 B2 | 4/2011 | Campero et al. | |
| 9,613,333 B2 | 4/2017 | Forster | |
| 10,572,703 B1 | 2/2020 | Shyamkumar | |
| 10,636,267 B2 | 4/2020 | Jeon et al. | |
| 10,820,171 B2 | 10/2020 | Jones et al. | |
| 11,030,675 B2 | 6/2021 | Kulkarni et al. | |
| 11,279,559 B1 | 3/2022 | Montgomery | |
| 2005/0093679 A1 | 5/2005 | Zai et al. | |
| 2005/0109845 A1 | 5/2005 | Ghaffari | |
| 2005/0149414 A1 | 7/2005 | Schrodt et al. | |
| 2007/0126585 A1 | 6/2007 | Okunev et al. | |
| 2008/0186174 A1 | 8/2008 | Alexis et al. | |
| 2011/0199211 A1* | 8/2011 | Campero | G08B 13/2462 340/572.1 |
| 2016/0055566 A1 | 2/2016 | Otani et al. | |
| 2018/0232796 A1 | 8/2018 | Glaser et al. | |
| 2018/0350218 A1 | 12/2018 | Jeon et al. | |
| 2021/0399429 A1* | 12/2021 | Garrido Lopez | H01Q 1/44 |

FOREIGN PATENT DOCUMENTS

| | | |
|---|---|---|
| JP | 2007-336185 | 12/2007 |
| JP | 2007-536642 | 12/2007 |
| JP | 2008-290848 | 12/2008 |
| JP | 2009-265742 | 11/2009 |
| JP | 2011-520097 | 7/2011 |
| JP | 2018-530819 | 10/2018 |
| WO | 2005/111959 | 11/2005 |
| WO | 2009/151778 | 12/2009 |
| WO | 2013/126391 | 8/2013 |
| WO | 2014/045816 | 3/2014 |
| WO | 2017/044321 | 3/2017 |
| WO | 2018/125977 | 7/2018 |
| WO | 2019/055932 | 3/2019 |
| WO | 2019/133347 | 7/2019 |
| WO | 2019/204694 | 10/2019 |
| WO | 2019/204698 | 10/2019 |
| WO | 2019/204704 | 10/2019 |
| WO | 2020/006202 | 1/2020 |
| WO | 2020/006219 | 1/2020 |
| WO | 2021/134066 | 7/2021 |
| WO | 2021/138237 | 7/2021 |
| WO | 2021/158926 | 8/2021 |
| WO | 2021/158931 | 9/2021 |
| WO | 2021/173752 | 9/2021 |
| WO | 2021/236649 | 11/2021 |
| WO | 2021/247628 | 12/2021 |

OTHER PUBLICATIONS

International Search Report and Written Opinion dated Feb. 8, 2022 issued in corresponding IA No. PCT/US2021/056176 filed Oct. 22, 2021.

International Preliminary Report on Patentability dated Apr. 13, 2023 issued in corresponding IA No. PCT/US2021/056182 filed Oct. 22, 2021.

International Preliminary Report on Patentability dated Apr. 13, 2023 issued in corresponding IA No. PCT/US2021/056176 filed Oct. 22, 2021.

Product A: Proposal for using BLE tags that combine LF trigger technology and Bluetooth Low Energy technology, High positional detection accuracy and ultra-low power consumption achieved with LF trigger technology, Automatic Identification, vol. 31, No. 2, Japan, Feb. 10, 2018, pp. 38-42.

Adding "CombiTag" to IC tag cooperation system, Library information integration system "LOOKS21/P," for which services from viewpoint of users have been enhanced further, Hitac, vol. 498, Japan, Nov. 1, 2008, pp. 11-12.

Trial Company, Introducing walk-through payment at supermarkets, Demonstration experiments using AI cameras and IC tags, Card Wave, vol. 31, No. 6, Japan, Dec. 25, 2018, pp. 14-15.

* cited by examiner

SYSTEMS CONTAINING MULTIPLE READ ZONES AND METHODS OF USE THEREOF

CROSS-REFERENCE TO RELATED APPLICATION(S)

The present application is a 371 of International Application No. PCT/US2021/056176, which was published in English on Apr. 28, 2022, and claims the benefit of U.S. Provisional Patent Application No. 63/104,664 filed Oct. 23, 2020, both of which is incorporated herein by reference in their entireties.

FIELD

The present disclosure is in the field of systems containing multiple read zones or areas and methods of use thereof to generate more accurate data for products labeled with a tag or label containing one or more digital triggers, and optionally a unique digital identity.

BACKGROUND

It is common in retail locations for products to be disrupted from their standard merchandising configuration/location by shoppers, employees, and/or other means. For products tagged with a digital trigger, such as an RFID tag, the result can be such products stacked in a manner that does not meet standard merchandising and/or storage standards and therefore may elude detection from a read zone that is intended to detect items in that merchandising and/or storage area.

There exists a need for systems for effectively, consistently, and accurately detecting items in a merchandising and/or storage area/configuration that is different from the intended configuration thus making detection difficult and methods of use thereof.

Therefore, systems containing multiple read area zones to generate more accurate item-level data for items in a merchandising and/or storage area/configuration that is different from the intended configuration thus making detection difficult, and methods of use thereof, are described herein.

SUMMARY

Systems containing multiple read area zones to generate more accurate item-level data, and methods of use thereof, are described herein. In some embodiments, the systems and methods described herein are used to detect items in a merchandising and/or storage area/configuration that is different from the intended configuration thus making detection difficult and/or inaccurate.

In some embodiments, the systems and methods described herein include or involve one or more local area read devices as described below. In some embodiments, the systems and methods include or involve a local read area device as described below in combination with a wide area read device. In some embodiments, the local area read device described below, alone or in combination with a wide area read device, is used to detect the removal or return of a product or products from a merchandising and/or storage location or area (also referred to as localized areas) in an establishment, such as a retail establishment, a warehouse, a distribution center, a grocery store, or other food-related establishment, or a bar or restaurant.

In some embodiments, the local area read device is a shelf or other type of structure that is used to present/configure products. In other embodiments, the local area read device can be a hand held device, such as a mobile device (phone, tablet, smart watch, etc.) or a handheld RFID reader. In still other embodiments, the local area read device is a combination of the above.

In some embodiments, the local read device is a smart shelf with an RFID read device and/or a single or plurality of RFID antenna. In some embodiments, the antenna are classified in two groups: short response and long response. In some embodiments, the short response antenna is placed in close proximity to one or more products in a first read area, e.g., read area #1. This read area may be made up of multiple antenna or read zones. Within read area #1, products tagged with a digital trigger are detected for the purpose of detecting an exit event or an entry event. In some embodiments, read area #1 has a closely controlled read zone so as to produce a quick response on product exit or entry and having that response be in close proximity to the shelf and the standard merchandising/storage product configuration.

In some embodiments, the long response antenna produces a second read area, e.g., read area #2 that is also monitoring the shelf but does so with a read field that is either higher in power or leveraging a different type of RF read field, resulting in a stronger and larger read area. Read area #2 is detecting entry events and exit event is a similar fashion to area #1 however read area #2 captures a greater space and therefore has a slower perceived reaction time. Data from Read area #2 is utilized to correct data representing products not presented to, or detected by, read area #1 based on product position or position of multiple products blocking visibility to read area #1. In some embodiments, the relative size of the read areas is reversed, e.g., read area #1 is larger and read area #2 is smaller as described above.

In some embodiments, the local area read device as described below, alone or in combination with a wide area read device, is used to detect the removal or return of a product or products from a merchandising and/or storage location or area in a retail establishment by detecting/reading a digital trigger on the product. In some embodiments, the digital trigger is, or is part of, a tag or label which is affixed or adhered to the product. In some embodiments, the digital trigger is a trigger that can be detected or read by radio frequencies including, but not limited, RFID (HF, UHF) and NFC. Other digital triggers include, but are not limited to, QR codes and bar codes. In other embodiments, the inlay tagged to the items for detection of activity of the items is a Bluetooth Low Energy (BLE) tag.

In some embodiments, a unique digital identity associated with the product is encoded into the digital trigger. Exemplary digital identities include, but are not limited to, an electronic product code, a serial number, an expiration date, a sell by date, a package date, or combination thereof. In some embodiments, the digital identities employed encoded in, or on, the digital trigger may be configured as a machine readable code and may be associated with metadata. In some embodiments, the one or more digital identities may be associated with an image captured by a vision or camera based systems. In some embodiments, the digital trigger is an RFID inlay having a digital identity encoded therein. In other embodiments, the digital trigger is a trigger other than an RFID inlay or is a trigger in combination with an RFID inlay.

I. DEFINITIONS

"Detector-based inventory management and/or shopping systems" as used herein typically refers to a systems containing one or more types of detectors that can confirm the presence of a product in an area; detect the movement of a product within an area or between areas in a merchandising and/or storage location; and/or provide a cashier-less or checkout-free shopping experience. Non-limiting examples of detectors include cameras or other vision-based devices; detectors containing a radio frequency sources, such as RFID readers, etc.; and/or detectors containing visible or non-visible light source.

"Item level sensor" as used herein typically refers to a digital trigger attached or affixed to a product or product and contains, or may contain, a unique digital identity (e.g., electronic product code (EPC), serial number, etc.) that is associated with the product.

"Vision- or camera-based checkout free or cashier less shopping systems", as used herein, means systems that use vision- or camera-based hardware and software to detect the movement of objects, for example, from a retail shelf and optionally placing them in a cart or basket and do not require a cashier or checkout location/kiosk for the consumer to check out.

"Digital trigger", as used herein, means any type of sensor that can be detected/read by a source. The source can use electromagnetic energy, such as radio frequencies, ultrasonic, infra-red frequencies, visible and non-visible light frequencies, etc. or cameras and other vision-based devices to detect or read the trigger. Examples include, but are not limited to, RFID (e.g., UHF, HF), NFC, QR Codes, bar codes, etc. and combinations thereof.

"Merchandising area", as used herein, typically refers to an area in retail location where products are located, arranged, etc. for sale/purchase.

"Storage area", as used herein, typically refers to an area in a retail location where products are stored, e.g., stock room, warehouse, etc.

II. Systems and Methods of Using Multiple Read Area Zones to Generate More Accurate Item-Level Data Systems and methods of using multiple read area zones to generate more accurate item-level data are described herein. In some embodiments, the systems and methods include or involve a local area read device as described below. In some embodiments, the systems and methods include or involve a local read area device as described below in combination with a wide area read device.

In some embodiments, the local area read device described below, alone or in combination with a wide area read device, is used to detect the removal or return of a product from a merchandising and/or storage location or area in a retail establishment and/or movement between different locations and/or areas.

In some embodiments, the local area read device described below, alone or in combination with a wide area read device, is used to detect the removal or return of a product from a merchandising and/or storage location or area in a retail establishment by detecting/reading a digital trigger on the product. In some embodiments, the digital trigger is, or is part of, a tag or label which is affixed or adhered to the product. In some embodiments, the digital trigger is a trigger that can be detected or read by radio frequencies including, but not limited, RFID (e.g., HF, UHF) and NFC. Other digital triggers include, but are not limited to, QR codes, bar codes, etc. In other embodiments, the inlay tagged to the items for detection of activity of the items is a Bluetooth Low Energy (BLE) tag.

In some embodiments, a unique digital identity associated with the product is encoded into the digital trigger. Exemplary digital identities include, but are not limited to, an electronic product code, a serial number, an expiration date, a sell by date, a package date, or combination thereof. In some embodiments, the digital identities employed encoded in, or on, the digital trigger may be configured as a machine readable code and may be associated with metadata. In some embodiments, the one or more digital identities may be associated with an image captured by a vision or camera based systems. In some embodiments, the digital trigger is an RFID inlay having a digital identity encoded therein. In other embodiments, the digital trigger is a trigger other than an RFID inlay or is a trigger in combination with an RFID inlay.

A. Local Area Read Devices

Different types of local area read devices can be used in the methods and systems described herein. In some embodiments, the local area read device is a shelf or other type of structure that is used to present/configure products. In other embodiments, the local area read device can be a hand held device, such as a mobile device (phone, tablet, smart watch, etc.) or a handheld RFID reader. In still other embodiments, the local area read device is a combination of the above.

In some embodiments, the local read device is a smart shelf with an RFID read device and/or a single or plurality of RFID antenna (FIGS. 1-7). In some embodiments, the antenna is classified in two groups: short response and long response. In some embodiments, the short response antenna is placed in close proximity to one or more products in read area #1. This read area may be made up of multiple antenna or read zones. Within read area #1, products tagged with a digital trigger, such as UHF RFID (wireless detection, RF detection, etc.) are detected for the purpose of detecting an exit event or an entry event. In some embodiments, read area #1 has a closely controlled read zone so as to produce a quick response on product exit or entry and having that response be in close proximity to the shelf and the standard merchandising/storage product configuration.

Figure 1:
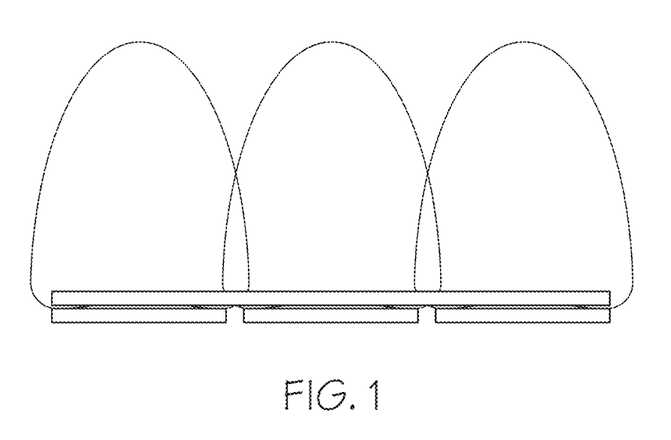
FIG. 1 is a representation of a plurality of smart shelves that define read area #1.

It is common in retail locations for products to be disrupted from their standard merchandising configuration/location by shoppers, employees, and/or other means. The result can be the product tagged with a digital trigger is stacked in a manner that does not meet standard merchandising standards thereby eluding detection from read area #1. Read area #1 is the primary data delivery zone and is therefore a highly controlled zone with more definition and operates in close proximity to products.

Figure 2:
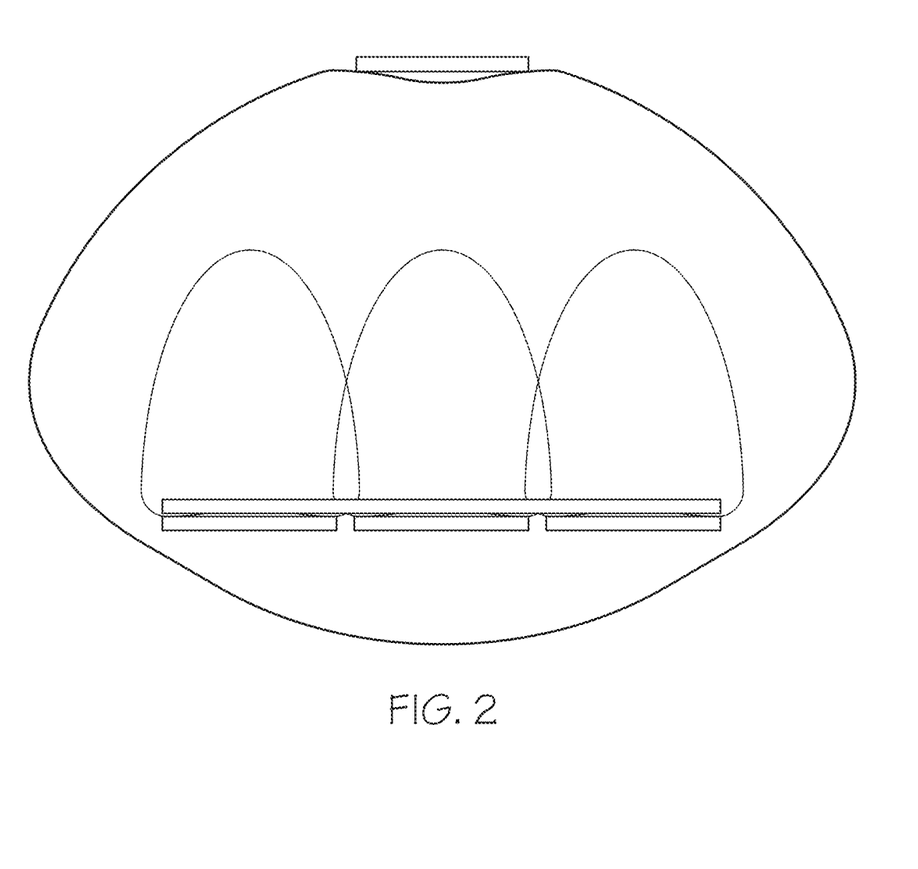
FIG. 2 is a representation of read area #2.

In some embodiments, the long response antenna produces read area #2 that is also monitoring the shelf but does so with a read field that is either higher in power or leveraging a different type of RF read field, resulting in a stronger and larger read area. Read area #2 is detecting entry events and exit event is a similar fashion to area #1 however read area #2 captures a greater space and therefore has a slower perceived reaction time. Data from Read area #2 is utilized to correct data representing products not presented to, or detected by, read area #1 based on product position or position of multiple products blocking visibility to read area #1. In some embodiments, the relative size of the read areas is reversed, e.g., read area #1 is larger and read area #2 is smaller as described above.

Figure 3:
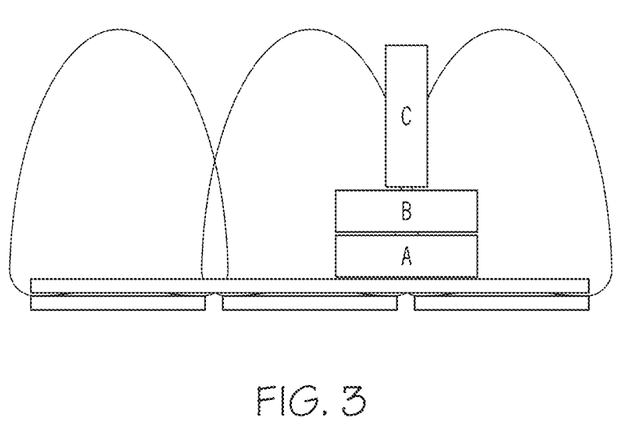
FIG. 3 is a representation of how RFID-tagged products, A, B, and C, are arranged on smart shelves that define read area #1.
Figure 4:
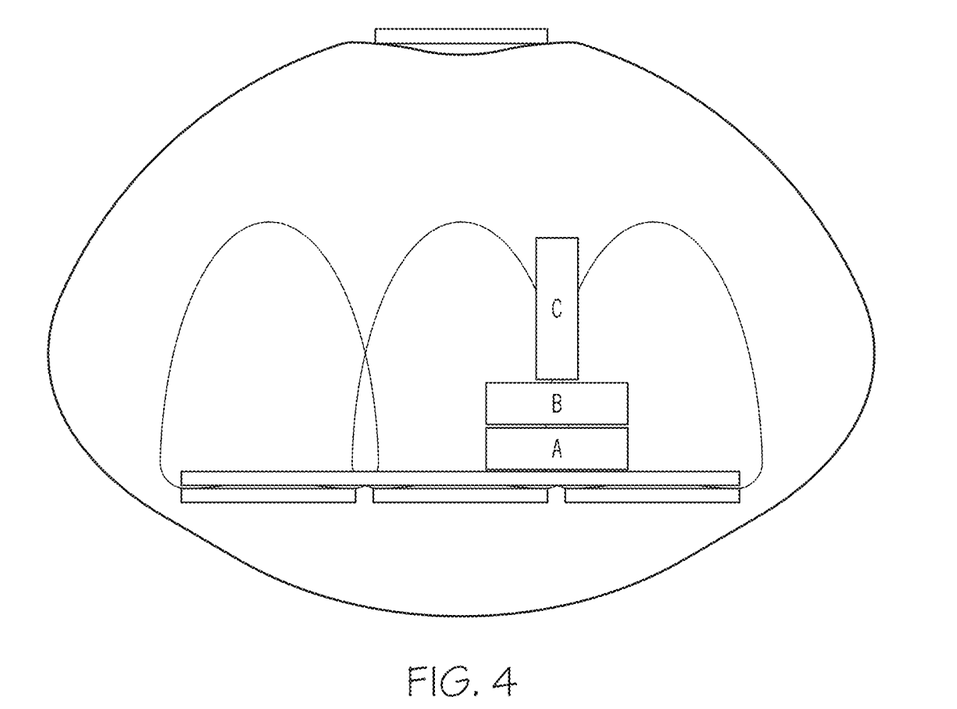
FIG. 4 is a representation of how RFID-tagged products, A, B, and C, are arranged on smart shelves and are detected by read area #2.
Figure 5:
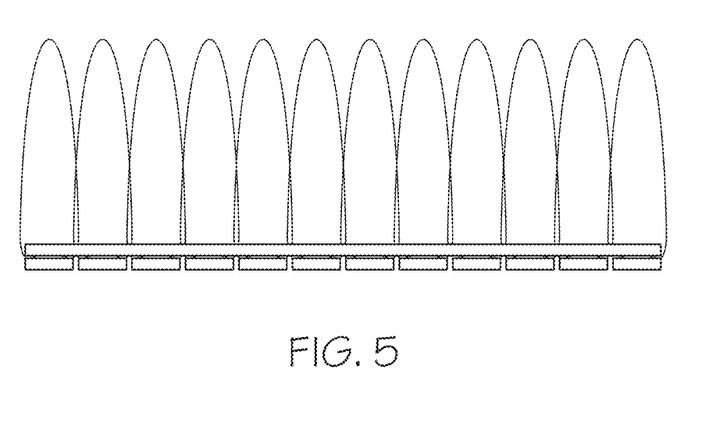
FIG. 5 is a representation of a plurality of smart shelves that define read area #1.
Figure 6:
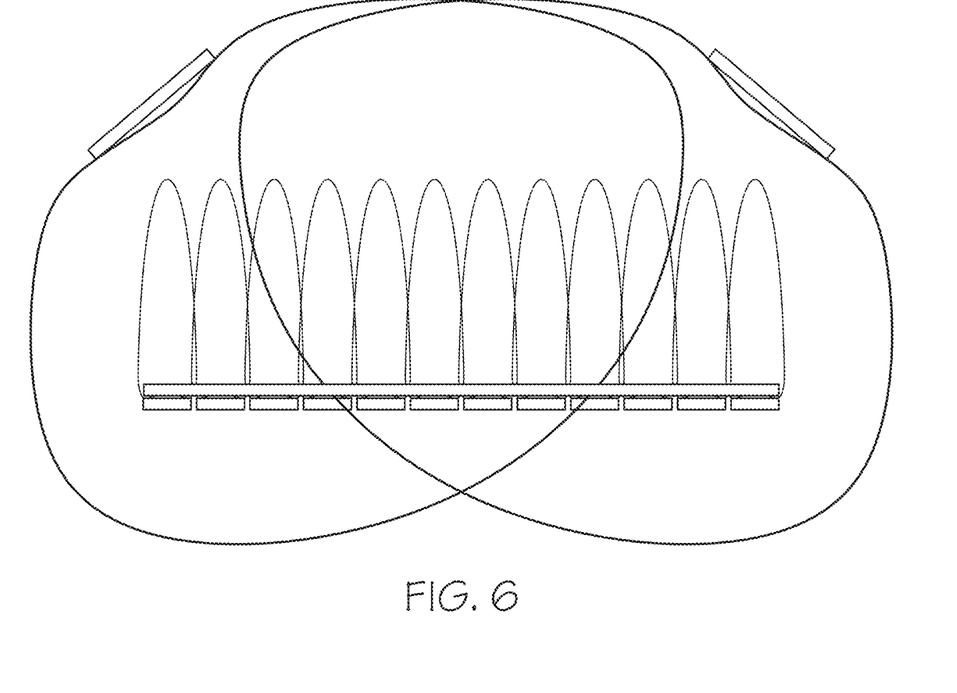
FIG. 6 is a representation of read area #2.
Figure 7:
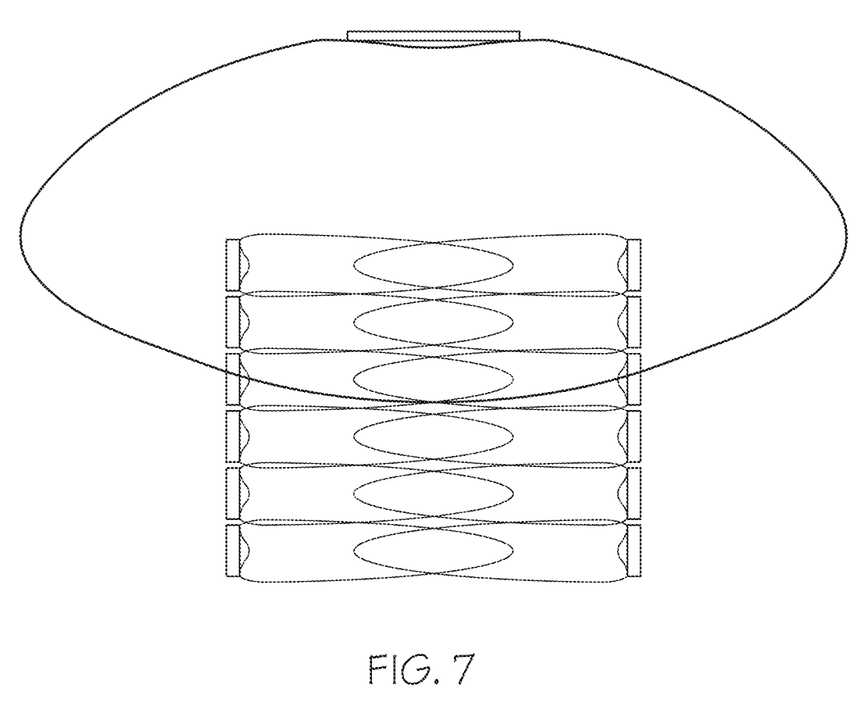
FIG. 7 is a representation of a plurality of antenna making up two sides of a product container/cooler as read area #1 and position of read area #2.

An example of how this method and hardware can be used is as follows. Products A, B, and C are located on a smart shelf. Product C is blocked from read area #1 based on the position of product C and product A+B. However, Product C is detected by read area #2 so as to notify the system that product C is still present on the shelf.

When product C is selected or picked from the shelf the data generated will include a designation that the exit occurred on read area #2 but not read area #1. This information provides depth of data to the system and notifies the system that a pick event from the shelf might have been delayed and inconsistent with a typical response time due to read area #2 covering a larger area. Detection only by read area #2 likely represents a non-standard product merchandising of product or products. Detection in read area #2, but not read area #1, can generate a notification to staff that product(s) that should be visible to read area #1 if properly merchandised is not visible and therefore requires re-merchandising by staff.

In some embodiments, the number of read zones is greater than 2 or less than 2, for example, 1, 3, 4, 5, or a greater number of read zones. In some embodiments, the multiple read areas have dual functions in both defined read areas, e.g., short range and long range. In still other embodiments, particular read areas have functions within another read area. In still other embodiments, the multiple read areas intersect and are generated from the same plane.

In some embodiments, data from distinct read areas are combined to provide depth in data or enrich data or generate more accurate data. In some embodiments, data can be reported in an event type fashion to signify if an item is visible in only one of the read areas or in both of the read areas, timing between exits, or governed by different filters or settings or data events within multiple read areas. Data from a plurality of defined read areas may provide depth in data for machine learning, artificial intelligence, localized software and actionable data.

In some embodiments, the data string may be represented by the following:

> [Tag ID, Time stamp, Read Area #1 last seen, Read Area #2 last seen, event entry/exit, RSSI, Doppler, Read Rate, reader, antenna, antenna zone, other data points]

The hardware configurations described above may vary depending on system design, leveraging near-field, mid-field or far-field antenna designs. In some embodiments, antenna types are combined within a read area, for example, having only one type of antenna per read area, having different antenna types in read area #1 than read area #2 or vice versa.

Other sensors and data inputs may also be desirable. These sensors might be non-RF based sensors such as vision, infrared, ultrasonic or other known devices. In such embodiments, appropriate read devices can be used in one or both (or more) read areas to detect the non-RF based sensors.

B. Wide Area Read Devices

In some embodiments, the wide-area represents or defines a read zone or multiple read zones that cover the area of the product while at rest as well as the area around where the product is merchandised. In some embodiments, wide-area coverage includes, but is not limited to, RFID real-time location systems (RTLS) that report back x and y coordinates. RTLS is typically used to pinpoint the exact location of items within a facility. In some embodiments, RTLS works through a combination of Bluetooth technology and GPS in order to monitor and track objects and interactions when they occur. In some embodiments, the RTLS functionality of the RFID reader is used only to complement the existing sensor suite in use.

In some embodiments, the wide area read device is or contains a phased array of overhead readers that work with multiple read zones in a set or predetermined configuration. Exemplary configurations include, but are not limited to, a north, south, east, and west configuration or another configuration in which the angle between the reader and/or the angle or degree of overlap varies or is different from a north, south, east, and west configuration. These multiple zones can be used to generate an x and y coordinate. In some embodiments, this RF coordinates are combined with vision coordinates (using a camera or other vision-based device) for an item to help provide confirmation after product selection.

C. Digital Triggers

In some embodiments, the products to be detected contain one or more digital triggers. In some embodiments, the digital trigger is an item level sensor. In some embodiments, the item level sensor can be any sensor known in the art that is suitable for the methods and applications described herein. In some embodiments, the sensor is, for example, a radio frequency identification (RFID, such as UHF or HF) sensor, a near field communication (NFC) sensor, a quick response (QR) code, machine readable code, vision system, Bluetooth Low Energy (BLE) beacons, or other digital identification (ID) systems.

1. RFID

In some embodiments, the digital trigger(s) is a radio Frequency item level sensor, also referred to as RFID tag, which is a wireless device with various amounts of memory, typically an EPC memory space of 96-128 bits, a TID memory space of 48-96 bits, and optional features such as user memories described in GS1. These sensors have a unique ID, respond to RF energy and broadcast the presence of particular items to which they are attached. There are several factors that influence the range and readability of RFID item level sensors and antennae (inlay) including size, power and frequency. Materials with high water content or metal packaging can influence the power response and or de-tune the frequency response. Packaging size, human readable data requirements and merchandising/storage also need to be considered in a deployment and sensor choice.

A variety of RFID item level sensor designs optimizing performance for standard and less common materials are available. In some embodiments, a variety of different sensors are used depending on the item to be tagged and/or the packaging used with the item. To evaluate the most effective inlay, RFID item level sensors can be tested on the product or products to be tagged to determine the appropriate sensor. For example, the product or products can be variable weight products, such as food (cheeses, deli meats, proteins, produce, etc.), contain higher percentages of water or other liquids, unique packaging, etc.

A typical RFID device generally includes an antenna for wirelessly transmitting and/or receiving RF signals and analog and/or digital electronics operatively connected thereto. So called active or semi-passive RFID devices may also include a battery or other suitable power source. Commonly, the electronics are implemented via an integrated circuit (IC) or microchip or other suitable electronic circuit and may include, e.g., communications electronics, data memory, control logic, etc. In operation, the IC or microchip functions to store and/or process information, modulate and/or demodulate RF signals, as well as optionally performing other specialized functions. In general, RFID devices can typical retain and communicate enough information to uniquely identify individuals, packages, inventory and/or other like objects, e.g., to which the RFID device is affixed.

Commonly, an RFID reader or base station is used to wirelessly obtain data or information (e.g., such as an identification code) communicated from an RFID device. Typically, an RFID device is configured to store, emit, or otherwise exhibit an identification code or other identifier(s). The manner in which the RFID reader interacts and/or communicates with the RFID device generally depends on the type of RFID device. A given RFID device is typically categorized as a passive device, an active device, a semi-passive device (also known as a battery-assisted or semi-active device) or a beacon type RFID device (which is generally considered as a sub-category of active devices). Passive RFID devices generally use no internal power source, and as such, they are passive devices which are only active when an RFID reader is nearby to power the RFID device, e.g., via wireless illumination of the RFID device with an RF signal and/or electromagnetic energy from the RFID reader. Conversely, semi-passive and active RFID devices are provided with their own power source (e.g., such as a small battery). To communicate, conventional RFID devices (other than so called beacon types) respond to queries or interrogations received from RFID readers. The response is typically achieved by backscattering, load modulation and/or other like techniques that are used to manipulate the RFID reader's field. Commonly, backscatter is used in far-field applications (i.e., where the distance between the RFID device and reader is greater than approximately a few wavelengths), and alternately, load modulation is used in near-field applications (i.e., where the distance between the RFID device and reader is within approximately a few wavelengths).

Passive RFID devices typically signal or communicate their respective data or information by backscattering a carrier wave from an RFID reader. That is, in the case of conventional passive RFID devices, in order to retrieve information therefrom, the RFID reader typically sends an excitation signal to the RFID device. The excitation signal energizes the RFID device which transmits the information stored therein back to the RFID reader. In turn, the RFID reader receives and decodes the information from the RFID device.

As previously noted, passive RFID devices commonly have no internal power supply. Rather, power for operation of a passive RFID device is provided by the energy in the incoming RF signal received by the RFID device from the RFID reader. Generally, a small electrical current induced in the antenna of the RFID device by the incoming RF signal provides sufficient power for the IC or microchip in the RFID device to power up and transmit a response. This means that the antenna generally has to be designed both to collect power from the incoming signal and also to transmit the outbound backscatter signal.

Passive RFID devices have the advantage of simplicity and long life (e.g., having no battery to go dead). Nevertheless, their performance may be limited. For example, passive RFID devices generally have a more limited range as compared to active RFID devices.

Active RFID devices, as opposed to passive ones, are generally provisioned with their own transmitter and a power source (e.g., a battery, photovoltaic cell, etc.). In essence, an active RFID device employs the self-powered transmitter to broadcast a signal which communicates the information stored on the IC or microchip in the RFID device. Commonly, an active RFID device will also use the power source to power the IC or microchip employed therein.

Generally, there are two kinds of active RFID devices-one can be considered as a transponder type of active RFID device and the other as a beacon type of active RFID device. A significant difference is that active transponder type RFID devices are only woken up when they receive a signal from an RFID reader. The transponder type RFID device, in response to the inquiry signal from the RFID reader, then broadcasts its information to the reader. As can be appreciated, this type of active RFID device conserves battery life by having the device broadcast its signal only when it is within range of a reader. Conversely, beacon type RFID devices transmit their identification code and/or other data or information autonomously (e.g., at defined intervals or periodically or otherwise) and do not respond to a specific interrogation from a reader.

Generally, active RFID devices, due to their on-board power supply, may transmit at higher power levels (e.g., as compared to passive devices), allowing them to be more robust in various operating environments. However, the battery or other on-board power supply can tend to cause active RFID devices to be relatively larger and/or more expensive to manufacture (e.g., as compared to passive devices). Additionally, as compared to passive RFID devices, active RFID devices have a potentially more limited shelf life—i.e., due to the limited lifespan of the battery. Nevertheless, the self-supported power supply commonly permits active RFID devices to include generally larger memories as compared to passive devices, and in some instances the on-board power source also allows the active device to include additional functionality, e.g., such as obtaining and/or storing environmental data from a suitable sensor.

Semi-passive RFID devices are similar to active devices in that they are typically provisioned with their own power source, but the battery commonly only powers the IC or microchip and does not provide power for signal broadcasting. Rather, like passive RFID devices, the response from the semi-passive RFID device is usually powered by means of backscattering the RF energy received from the RFID reader, i.e., the energy is reflected back to the reader as with passive devices. In a semi-passive RFID device, the battery also commonly serves as a power source for data storage.

A conventional RFID device will often operate in one of a variety of frequency ranges including, e.g., a low frequency (LF) range (i.e., from approximately 30 kHz to approximately 300 kHz), a high frequency (HF) range (i.e., from approximately 3 MHz to approximately 30 MHz) and an ultra-high frequency (UHF) range (i.e., from approximately 300 MHz to approximately 3 GHz). A passive device will commonly operate in any one of the aforementioned frequency ranges. In particular, for passive devices: LF systems commonly operate at around 124 kHz, 125 kHz or 135 kHz; HF systems commonly operate at around 13.56 MHz; and, UHF systems commonly use a band anywhere from 860 MHz to 960 MHz. Alternately, some passive device systems also use 2.45 GHz and other areas of the radio spectrum. Active RFID devices typically operate at around 455 MHz, 2.45 GHz, or 5.8 GHz. Often, semi-passive devices use a frequency around 2.4 GHz.

The read range of an RFID device (i.e., the range at which the RFID reader can communicate with the RFID device) is generally determined by many factors, e.g., the type of device (i.e., active, passive, etc.). In some embodiments, passive LF RFID devices (also referred to as LFID or LowFID devices) can usually be read from within approximately 12 inches (0.33 meters); passive HF RFID devices (also referred to as HFID or HighFID devices) can usually be read from up to approximately 3 feet (1 meter); and passive UHF RFID devices (also referred to as UHFID devices) can be typically read from approximately 10 feet (3.05 meters) or more. However, the distances above are exemplary and the distances may vary (e.g., longer or shorter) depending on the characteristics listed above. One important factor influencing the read range for passive RFID devices is the method used to transmit data from the device to the reader, i.e., the coupling mode between the device and the reader-which can typically be either inductive coupling or radiative/propagation coupling. Passive LFID devices and passive HFID devices commonly use inductive coupling between the device and the reader, whereas passive UHFID devices commonly use radiative or propagation coupling between the device and the reader.

In inductive coupling applications (e.g., as are conventionally used by passive LFID and HFID devices), the device and reader are typically each provisioned with a coil antenna that together form an electromagnetic field there between. In inductive coupling applications, the device draws power from the field, uses the power to run the circuitry on the device's IC or microchip and then changes the electric load on the device antenna. Consequently, the reader antenna senses the change or changes in the electromagnetic field and converts these changes into data that is understood by the reader or adjunct computer. Because the coil in the device antenna and the coil in the reader antenna have to form an electromagnetic field there between in order to complete the inductive coupling between the device and the reader, the device often has to be fairly close to the reader antenna, which therefore tends to limit the read range of these systems.

Alternately, in radiative or propagation coupling applications (e.g., as are conventionally used by passive UHFID devices), rather than forming an electromagnetic field between the respective antennas of the reader and device, the reader emits electromagnetic energy which illuminates the device. In turn, the device gathers the energy from the reader via its antenna, and the device's IC or microchip uses the gathered energy to change the load on the device antenna and reflect back an altered signal, i.e., backscatter. Commonly, UHFID devices can communicate data in a variety of different ways, e.g., they can increase the amplitude of the reflected wave sent back to the reader (i.e., amplitude shift keying), shift the reflected wave so it is out of phase received wave (i.e., phase shift keying) or change the frequency of the reflected wave (i.e., frequency shift keying). In any event, the reader picks up the backscattered signal and converts the altered wave into data that is understood by the reader or adjunct computer.

The antenna employed in an RFID device is also commonly affected by numerous factors, e.g., the intended application, the type of device (i.e., active, passive, semi-active, etc.), the desired read range, the device-to-reader coupling mode, the frequency of operation of the device, etc. For example, insomuch as passive LFID devices are normally inductively coupled with the reader, and because the voltage induced in the device antenna is proportional to the operating frequency of the device, passive LFID devices are typically provisioned with a coil antenna having many turns in order to produce enough voltage to operate the device's IC or microchip. Comparatively, a conventional HFID passive device will often be provisioned with an antenna which is a planar spiral (e.g., with 5 to 7 turns over a credit-card-sized form factor), which can usually provide read ranges on the order of tens of centimeters. Commonly, HFID antenna coils can be less costly to produce (e.g., compared to LFID antenna coils), since they can be made using techniques relatively less expensive than wire winding, e.g., lithography or the like. UHFID passive devices are usually radiatively and/or propagationally coupled with the reader antenna and consequently can often employ conventional dipole-like antennas.

In some embodiments, the digital trigger is UHF Gen2 RFID or similar standard. Other standards established by various standards setting bodies can also be used. Such standards may be item/product specific or sector or market specific.

a. Sensors for Plastic Packaging

In some embodiments, the one or more sensors are designed for plastic packaging. In some embodiments, the plastic packaging is used to package food products, such as fresh cut fruits and/or vegetable. Suitable sensors are available from Avery Dennison. In some embodiments, the sensor is model AD324 as shown in FIGS. 1 and 1a. In some embodiments, the RFID sensor placement on the packaging is such that the product inside the package does not overlap the inlay area by more than 20% when the product is at rest on a shelf. In some embodiments, the RFID sensor may be a low profile inlay to reduce coverage area.

b. Low Profile Sensors

In some embodiments, the one or more sensors are low profile item level sensors for difficult to read materials. In some embodiments, these sensors are used on food products, such as packaged cheeses. In some embodiments, the sensors are AD163 and AD456 (FIGS. 2, 2a, and 3) available from Avery Dennison. In some embodiments, the sensors can be mounted flush, with a spacer or lifted along its length to form a low profile flag tag. In some embodiments, the tag contains a built-in structure that separates the dielectric qualities of the product and the inlay. In some embodiments, the low profile inlay size is used to reduce coverage area.

c. Microwave-Safe Inlays

In some embodiments, the RFID sensor is a microwave-safe sensor. Microwave-safe sensors/inlays are described in WO2018/125977, WO2019/204694, WO/2019/204698, WO/2019/204704, WO2020/006202, and WO2020/006219 and U.S. Ser. No. 62/954,909 and 62/954,454, which are incorporated herein by reference.

In some embodiments, the micro-wave safe RFID tag includes an antenna defining a gap and configured to operate at a first frequency. An RFID chip and an antenna electrically coupled to the antenna across the gap. A shielding structure is electrically coupled to the antenna across the gap and overlays the RFID chip. The shielding structure includes a shield conductor and a shield dielectric at least partially positioned between the shield conductor and the RFID chip. The shielding structure is configured to limit the voltage across the gap when the antenna is exposed to a second frequency that is greater than the first frequency.

In some embodiments, the antenna is, or contains, an antenna with a sheet resistance in the range of approximately 100 ohms to approximately 230 ohms. In another aspect, an RFID tag includes an RFID chip and an antenna electrically coupled to the RFID chip. The antenna is, or contains, a conductor formed of a base material and a second material with different coefficients of thermal expansion configured to cause the antenna to fracture into multiple pieces upon being subjected to heating.

In some embodiments, the microwave-safe RFID tag includes a substrate having opposing first and second surfaces. An antenna is secured to the first surface, defines a gap, and is configured to operate at a first frequency. An RFID chip is electrically coupled to the antenna across the gap. A shielding structure is secured to the second surface of the substrate, with at least a portion of the shielding structure being in substantial alignment with the gap. The shielding structure is configured to limit the voltage across the gap when the antenna is exposed to a second frequency that is greater than the first frequency.

In some embodiments, the antenna of the RFID tag is no larger than 40 mm in the maximum dimension. In some embodiments, a center of the shielding structure is substantially aligned with the RFID chip. In some embodiments, the shielding structure is larger than the gap. In some embodiments, the shielding structure is electrically coupled to the antenna through the substrate. In some embodiments, the RFID tag further includes first and second conductive bridges that extend between the antenna and the shielding structure through the substrate so that the first and second conductive bridges are associated with the antenna at opposing sides of the gap. In some embodiments, the first and second conductive bridges are substantially identical. In some embodiments, the first and second conductive bridges are substantially equally spaced from the gap. In some embodiments, each of the first and second conductive bridges is positioned closer to an associated edge of the shielding structure than to the gap. In some embodiments, each of the first and second conductive bridges comprises an electro-chemically formed via. In some embodiments, each of the first and second conductive bridges comprise a crimp. In some embodiments, each of the first and second conductive bridges comprise conductive ink(s) received by a respective hole defined in the substrate.

In some embodiments, the microwave tolerant RFID tag device can be secured to an item to be placed in a microwave field, such as food item, to be thawed, heated, reheated or cooked in a microwave oven. The RFID tag device contains at least one antenna designed to operate at one or more frequencies, and an RFID chip carrying data related to the product to which it is attached and/or the microwave process (e.g., cooking) that the microwave oven is required to perform. In some embodiments, the antenna of the RFID tag device is designed to prevent a destructive arc when placed in a high-level 2.45 GHz field, and minimizes heating of the RFID tag itself during the microwave process.

In other embodiments, an RFID reader system is coupled into a microwave oven cavity to be able to read the RFID tag data before the high-level 2.45 GHz field is applied, as the high-field is likely to destroy the RFID tag device. The RFID reader system may operate at 2.45 GHz and share or be co-located with the oven emitter, or operate at a separate frequency such as UHF in the range of 900 MHz to 930 MHz, or can operate at both frequencies. The RFID reader system then interfaces with the oven controller to authorize and/or control the cooking process of the tagged food item.

In some embodiments, the microwave safe RFID tag preferably contains a split ring (or shield) conductor formed on one side of a dielectric, a coil antenna conductor formed on an opposite side of the dielectric, and a RFID chip. The split ring conductor is separated from the coil antenna conductor by a dielectric. Further, the split ring conductor covers the majority of the coil antenna conductor, such that the split ring conductor capacitively couples to the coil antenna conductor via the dielectric. Additionally, the split ring conductor contains a gap which allows the microwave current to flow through the coil antenna conductor, yet no part of the coil antenna conductor in the gap interacts with the microwave current, which prevents arcing.

In other embodiments, the microwave safe RFID tag device contains a second split ring conductor which is rotated opposite of the first split ring conductor such that the gaps of the conductors do not align and current does not flow in the gaps. The coil antenna conductor is then positioned between the first and the second split ring conductors and capacitively couples to the conductors, effectively shorting the coil antenna conductor and the first and the second split ring conductors to prevent arcing and excessive current flow along the coil antenna conductor.

In other embodiments, the microwave-safe RFID inlay contains a pair of dipole arms extending from a tuning loop, wherein each of said dipole arms terminates in a load end. The conductive structure is further configured to have a metal mass that is less than a standard detection threshold of a metal detector that is used to scan food product items and their packaging. Additionally, the conductive structure has an area large enough to achieve a required or desired performance, but still below the typical standard detection threshold associated with scanning a food item or packaging for a foreign metal object of approximately a 1 mm diameter metal sphere. The conductive structure may be manufactured by printing a conductive ink, or by cutting a metal foil. A thickness of the overall conductive structure is then reduced to no less than a skin depth calculated for the respective conductive structure material and frequency. Portions of each load end may be hollowed out so that areas of the conductive structure having a lower current flow are removed with minimal impact on overall RFID performance, while also achieving a conductive structure with a mass below the detection threshold of the metal detector.

In other embodiments, packaging for a microwavable food item is provided. The packaging includes a first package member configured to be microwaved and a second package member associated with the first member, with the second package member being configured to be dissociated from the first package member prior to microwaving the first package member. The packaging also includes an RFID tag containing a reactive strap and a far-field antenna. The reactive strap is associated with the first package member, while the far-field antenna is associated with the second package member and is separate from the reactive strap. The reactive strap is configured to be coupled to the far-field antenna when the second package member is associated with the first package member and to be decoupled from the far-field antenna when the second package member is dissociated from the first package member. The RFID tag is capable of far-field communication when the reactive strap is coupled to the far-field antenna, while the reactive strap is capable of only near-field communication when it is decoupled from the far-field antenna.

In some embodiments, the microwave-safe RFID sensor is Wavesafe™, available from Avery Dennison. Wavesafe™ is a microwave-safe UHF RFID solution developed by Avery Dennison in 2017 and introduced to the market in 2019, for item-level tagging of fresh and frozen perishable packaged food products ensuring safety compliance. Wavesafe™ is designed to prevent arcing or heat build-up during microwaving while still delivering highly accurate read rates for time tracking.

Commercially available sensors include AD251, available from Avery Dennison (FIGS. 4 and 4a). In some embodiments, the microwave-safe inlay is used for meats and seafood, including those packaged in/with foam trays. In some embodiments, the microwave-safe inlay is compliant with TÜV Rheinland® T-Mark certification standards. In some embodiments, the RFID sensor is placed on the outer side of the foam tray to ensure separation from the item.

Packaging including one or more of the sensors described above are also described herein. In some embodiments, the packaging is suitable for packaging variable weight-price items, such as meats, seafood, fresh cut fruits and vegetables, and cheeses.

d. Flagtags

In some embodiments, the sensor is, or contains, a flagtag. A flagtag is a label or tag containing a digital trigger, such as RFID, such that a portion of the tag or label can be offset from the rest of the tag or label. This can be helpful in reducing or eliminating interference between the item to which the tag or label is attached and the digital trigger (e.g., metallic item or packaging and an RFID metallic antenna. A variety of flagtag constructions are known in the art. In some embodiments, the construction has a fold to create the offset. An example is the Midas Flagtag® available from Avery Dennison. However, other flagtag constructions can be used.

2. NFC

Near field communication, abbreviated NFC, is a form of contactless communication between mobile devices, such as smartphones or tablets, that utilizes electromagnetic radio fields rather than radio transmissions (e.g., Bluetooth, WiFi). NFC is an offshoot of RFID design for use by device and objects that are in close proximity to each other. Three types of NFC technology are currently in use: Type A, Type B, and FeliCa. The technology behind NFC allows a device, known as a reader, interrogator, or active device, to create a radio frequency current that communicates with another NFC compatible device or a small NFC tag holding the information the reader wants. Passive devices, such as the NFC tags, store information and communicate with the reader but do not actively read other devices. Peer-to-peer communication through two active devices is also a possibility with NFC. This allows both devices to send and receive information.

3. QR Codes

Quick Response (QR) codes are a type of matrix barcode (2-D barcode) which is machine-readable. QR codes often contain data for a locator, identifier, or tracker that points to a website or application. A QR code uses four standardized encoding modes (numeric, alphanumeric, byte/binary, and kanji) to store data efficiently; extensions may also be used. A QR code is detected by a 2-dimensional digital image sensor and then digitally analyzed by a programmed processor. The processor locates the three distinctive squares at the corners of the QR code image, using a smaller square (or multiple squares) near the fourth corner to normalize the image for size, orientation, and angle of viewing. The small dots throughout the QR code are then converted to binary numbers and validated with an error-correcting algorithm.

The amount of data that can be stored in the QR code symbol depends on the datatype (mode, or input character set), version (1, . . . , 40, indicating the overall dimensions of the symbol, i.e. 4× version number+17 dots on each side), and error correction level. The maximum storage capacities occur for version 40 and error correction level L (low), denoted by 40-L.

4. Electronic Article Surveillance

In some embodiments, the systems and methods described herein includes methods, systems, hardware, and sensors for electronic article surveillance (EAS) for loss prevention. Exemplary methods, systems, hardware, and sensors are described in U.S. Ser. Nos. 62/970,913; 62/970,933; and 62/981,206, which are incorporated herein by reference.

a. Inlays

In some embodiments, an electronic article surveillance system includes at least one RFID device having an antenna, which is often referred to as an inlay. The system further includes a first read zone and a second read zone, with a relatively small transition zone positioned there between. The conductivity of the antenna of the at least one RFID device is reduced to reduce the peak sensitivity of the at least one RFID device and to increase the bandwidth of the at least one RFID device, thereby allowing for the transition zone to be relatively small without the at least one RFID device being read in the first read zone while in the second read zone and without the at least one RFID device being read in the second read zone while in the first read zone.

In other embodiments, an EAS system includes a first RFID device having a first antenna and associated to a first article and a second RFID device having a second antenna and associated to a second article. The system also includes a first read zone and a second read zone, with a transition zone positioned there between and configured to prevent an RFID device from being read in the first read zone while in the second read zone and to prevent an RFID device from being read in the second read zone while in the first read zone. The first and second articles are configured to differently affect performance of the associated RFID device, with the first and second antennas being differently configured based at least in part on the nature of the associated articles so as to have similar read range at a predetermined frequency.

In still other embodiments, an EAS system is provided for determining a position of an RFID device configured to transmit a return signal upon receiving an RF signal. The electronic surveillance system includes first and second read zones, first and second receiving antennas, and a controller. The first receiving antenna is configured to receive a return signal at a first strength, while the second receiving antenna is configured to receive the return signal at a second strength. The controller is configured to determine whether the RFID device is positioned in the first read zone based at least in part on the difference between the first and second strengths.

In some embodiments, the EAS system determines the position of an RFID device configured to transmit return signals upon receiving RF signals. The electronic surveillance system includes first and second read zones, first and second receiving antennas, and a controller. The first receiving antenna is configured to transmit a first RF signal to the RFID device and to change the power of the first RF signal to a first power corresponding to a threshold at which a first return signal from the RFID device is received by the first receiving antenna. The second receiving antenna is configured to transmit a second RF signal to the RFID device and to change the power of the second RF signal to a second power corresponding to a threshold at which a second return signal from the RFID device is received by the second receiving antenna. The controller is configured to determine whether the RFID device is positioned in the first read zone based at least in part on the difference between the first and second strengths.

b. Readers

In some embodiments, an EAS system includes a first read zone having an associated RFID reader and a second read zone having an associated RFID reader configured to detect an RFID device at a trigger threshold. The system further includes a controller configured to set the trigger threshold based at least in part on a factor selected from the group consisting of a value of a sensor of an RFID device, a number of times that an RFID device is detected in the first read zone, and whether an RFID device is detected in the first read zone under predetermined conditions.

In other embodiments, an EAS system includes a first read zone including an associated RFID reader, with a piece of infrastructure at least partially positioned within the first read zone. An RFID guard device is secured with respect to the piece of infrastructure. A second read zone of the systems includes an associated RFID reader configured to detect an RFID inventory device associated with a piece of inventory removably associated with the piece of infrastructure at a trigger threshold. The system also includes a controller configured to, when the RFID guard device is detected by the RFID reader, initiate a response selected from the group consisting of modifying the trigger threshold, modifying an amount of power transmitted by the RFID reader associated with the second read zone, modifying a direction in which power is transmitted by the RFID reader associated with the second read zone, and transmitting a signal indicative of a need to move the piece of infrastructure away from the second read zone.

D. Data Paths/Software

In some embodiments, the system receives various formats of data from a plurality of different data sources, repackages the received data for a particular destination, and securely and reliably delivers the packaged digital identity data. Methods and systems for receiving and processing data are described in U.S. Ser. No. 63/034,079, which is incorporated herein by reference.

In some embodiments, the data delivered from the present invention is a set of data or a segment of data from one of a plurality of data sources. These various data sources may be a number of different sensors that collect data based on their particular purpose. The invention anticipates combining data from a single or from a plurality of read areas and combining the multiple data inputs at a repository and/or delivering singular or multiple data sets to machine learning algorithms and/or artificial intelligence systems.

In some embodiments the data delivered from the present invention is combined with other data sources to determine system actions or activity and/or initiate or negate system internal or external notifications.

In some embodiments external sensors collect data that influence the thresholds and events delivered by the present invention.

In some embodiments data and/or event data influences the thresholds and events delivered by external and/or other sensors.

In some embodiments data sources may cross communicate with each other for the purpose of dynamically adjusting settings within that source device. This method provides dynamic adjustment influenced by the environment as interpreted by other data sources or source devices and sensors.

In some embodiments, the system contains a repository for receiving data about a serialized item from a source, i.e., an item containing a unique digital identity. In some embodiments, the repository may be a designated application, such as a cloud application, for example, an intermediate software. In other embodiments, the cloud application may be a platform that assigns and/or manages unique digital identifies for tagged products. Such a platform can provide supply chain information, authentication, track and trace, brand protection, and/or customer engagement experiences. In some embodiments, the platform can receive data about the serialized item from the source and manage the product's digital identity. The repository may similarly manage a volume of inventory of the product based on the received information from the source, and is further configured to combine or aggregate the received data about the product with other product specific data, environmental specific data, consumer behavior data, or other variable and/or fixed data feeds.

In some embodiments, the serialized item may be a RFID tagged, UPC coded or ERP coded product that contains a digital identity about the product that is readable by a source. The digital identity may contain a product unique identity, an item expiration, or other product related data, and the source of the data may contain an edge device, such as smart shelves, smart coolers, smart stores, or smart storage having a RFID reader/interrogator that has an electronic display and that monitors the products in proximity thereto. For example, when the serialized item is removed from, to, or around the source, the source may communicate that information to the repository. In some embodiments, the source may be a handheld device, such as a mobile device including, but not limited to, a smart phone, tablet, smart watch, etc.

In some embodiments, the system further contains a single or plurality of digital destinations including, but not limited to, cloud application(s). The destination application is configured to receive and publish the combined data sent from the repository via a connector. The connector may be an active directory gateway, cloud connector or the like. The destination application can provide product data, availability, inventory, etc. to searchers in a local area. Additionally, pricing information related to the product may be manipulated by the destination application based on, for example, the product expiration date, shelf life or other data that suits user need and/or preference.

The destination application may then publish the data in a searchable format. Additionally, the destination application can transmit the data back to the source or other electronic display at a retail location, so that the same may benefit from the aggregated and/or updated data. For example, a consumer could view an identical price for the product online at the destination application that they would see at the retail location.

In some embodiments, the methods and systems are as described above and the systems contain a destination cloud application for receiving, manipulating, and publishing data about a serialized item from a source. The serialized item may include, without limitation, a RFID tagged, UPC coded or ERP coded product that contains a digital identity about the product that is readable by the source. The digital identity may include a product unique identity, an item expiration, or other useful product data. The source may be an edge device which can contain a fixed or handheld device for communication with sensors or machine readable code, such as smart shelves, smart coolers, smart stores, or smart storage and having a RFID reader/interrogator that has an electronic display and monitors the products/serialized items located at the source. For example, when a serialized item is removed, added, or manipulated by a customer or staff from, to, or around the source, the source may communicate that information to the destination cloud application.

Similar to the previous embodiment referenced above, the destination cloud application receives the data about the serialized item from the source, and manages the product's digital identity via a connector. The destination cloud application similarly manages a volume of inventory of the product based on the received information from the source. The destination cloud application is configured to combine the received data about the product with other product specific data. The connector may be an active directory gateway, cloud connector or similar device. The destination cloud application can then provide the combined product data or any portion thereof to searchers in a local area. Additionally, pricing information related to the product may be manipulated by the destination cloud application based on, for example, the product expiration date, shelf life or other useful data.

The destination cloud application may then publish the data in a searchable format available to consumers in a local area. Additionally, the destination application or repository can transmit the data back to the source or other electronic display at a retail location, which may also use the combined data. For example, a consumer may view an identical price for the product online at the destination cloud application that they would see at the retail location.

In other embodiments, the methods and systems described herein include processes for increasing migration and accessibility of product related data. The system contains a designated application, such as a cloud application, for receiving data about a serialized item from a source, and the designated application may be an intermediate software. As above, the serialized item may be an RFID tagged, UPC coded or ERP coded product that contains a digital identity about the product that is readable by the source, and the digital identity may contain a product unique identity, an item expiration, or other useful product data or information. The source may be an edge device, such as smart shelves, smart coolers, smart stores, or smart storage with a RFID reader/interrogator that has an electronic display and the ability to monitor the serialized items. For example, when a serialized item is removed from the source, the source may communicate that information to the repository which may, in turn, update the product data stored therein.

The designated application is configured to receive the data about the serialized item from the source, and manage the product's digital identity. The designated application similarly manages a volume of inventory of the product based upon the received information from the source. The designated application is further configured to merge the received data about the product with other product specific data, and may also receive data related to the serialized item from a plurality of data collection points. The plurality of data collection points are sources that do not otherwise lend themselves to a data share atmosphere, such as inventory scans, point of sale data, distributor data, data center data or the like.

The system can further contain a destination application. The destination application is configured to receive, manipulate, and publish the combined data sent from the designated cloud application. The destination application can provide product data, availability, and inventory data to searchers in a local area. Additionally, pricing information related to the product may be manipulated by the destination application based upon the product expiration, shelf life or other data related to the product.

The destination application, e.g., cloud application, then publishes the combined data in a searchable format for consumers in a local area. Additionally, the destination application can transmit the data back to the source or other electronic display at a retail location. A consumer could then view an identical price for the product online at the destination application that they would see at the retail location, and determine if there is local inventory in stock for purchase.

In some embodiments, the methods described herein include or contain edgeware. Edgeware is embedded software that operates in the reader hardware, eliminating the need for on-premises computer equipment and servers. Edgeware simplifies the data path and reduces the software development demands on users. In some embodiments, edgeware delivers event based data, as described above, directly from the reader to local and/or cloud destinations. The event based data is reliable and the software is optimized to reduce stray reads and provide the flexibility to adjust the volume of data delivered from the device to the data destination.

E. Identifying Images in Close Proximity to a Mobile Device and/or Within a Digital Image In some embodiments, the systems and methods described herein can be used in combination with methods for identifying items that are in close proximity to a mobile device and/or are within a digital image. Methods for such identification are described in U.S. Ser. No. 63/026,392, which is incorporated herein by reference.

The mobile device includes, but is not limited to, smart phones, smartwatches, fitness trackers, and cameras. In some embodiments, the location of the mobile device is determined using one or more methods or techniques known in the art. Suitable methods and techniques include, but are not limited to, outdoor positioning systems ("OPS") and indoor positioning systems ("IPS"). Exemplary OPS include, but are not limited to, the global positioning system ("GPS").

Exemplary IPS include, but are not limited to, non-radio technologies and wireless technologies. Examples of non-radio technologies include, but are not limited to, magnetic positioning, inertial measurements, positioning based on visual markers, and location based on known visual features. Examples of wireless technologies include, but are not limited to, ultra wide band (UWB), WiFi positioning system (WiPS or WFPS), Bluetooth, Bluetooth 5.1, Bluetooth low energy (BLE), choke point concepts, grid concepts, long range sense concepts, angle of arrival, time of arrival, received signal strength indication, and combinations thereof.

In some embodiments, the method or techniques used to determine the location of the mobile device is accurate within 5 meters, 4 meters, 3 meters, 2 meters, 1 meter, 0.9 meters, 0.8 meters, 0.7 meters, 0.6 meters, 0.5 meters, 0.4 meters, 0.3 meters, 0.2 meters, or 0.1 meters.

In some embodiments, the location of the mobile device is determined using one or more techniques described herein and one or more items in close proximity to the mobile device are identified. In some embodiments, the term "close proximity" means within about 10 meters, 9 meters, 8 meters, 7 meters, 6 meters, 5 meters, 4 meters, 3 meters, 2 meters, 1 meter, 0.9 meters, 0.8 meters, 0.7 meters, 0.6 meters, 0.5 meters, 0.4 meters, 0.3 meters, 0.2 meters, or 0.1 meter. However, the item or items may be further away.

The identity of the item or items can be determined using one or more techniques known in the art. Exemplary techniques include, but are not limited to, planograms; visual inventory; RFID handheld inventory; RFID overhead inventory; vision system inventory; QR; barcode; NEC; or other methods known in the art.

In some embodiments, one or more items at the location of the mobile device have attached thereto one or more sensors which can be detected by localized scanners. Such items are said to be digitally identified. The sensors can be incorporated into a label, such as a pressure adhesive label or other type of label, or a tag, such as a hanging tag. The sensor can be any sensor known in the art that is suitable for the methods and applications described herein. In some embodiments, the sensor is, for example, a radio frequency identification (RFID, such as UHF or HF) sensor, a near field communication (NFC) sensor, a quick response (QR) code, machine readable code, vision system, Bluetooth Low Energy (BLE) beacons, or other digital identification (ID) systems. In some embodiments, the location of the mobile device is determined by one or more of the techniques described above and the items in proximity to the mobile device are identified using UHF RFID. In some embodiments, the digital ID system is UHF Gen2 RFID or similar standard.

In some embodiments, the methods described herein include or involve identifying one or more items within a digital image, such as a photograph or video. The photograph or video can be taken using a mobile device including, but not limited to, smart phone, tablet, smartwatch, digital camera, etc. In some embodiments, the one or more items within the photograph or video have a digital ID recorded by a reader in the device itself, a smart shelf, a scheduled inventory run, or other digital ID reader. In some embodiments, the image has an identification (ID)/time stamp that is used to associate the items in the image that have been read in the same area as the image so that the items can be actively searched as a digital image to highlight or list items that are in the image. In some embodiments, the identification (ID) stamp that indicates the location of the device used to take the photograph or video can be determined or generated using one or more of the techniques described above.

In some embodiments, the location of the device and the item or items in proximity and/or located within a photograph or video are stored in a digital repository. In some embodiment, the location of the device and the item or items are stored in the same digital repository or different digital repositories. The digital repository can be a cloud based application, locally hosted (e.g., on the device itself or a device on the premises, such as a lap top, tablet, or mobile device), or combinations thereof. In some embodiments, the location of the device and the identity of the item or items are stored in a digital repository as described above and the location of the device and the identity of the item or items are associated with each other such that the items and information thereon are provided to a user, e.g., a customer. The user can manually search/navigate all identified items. Alternatively, the user can search manually in combination with one or more filters to limit or reduce the number of items presented to the user. For example, the user may wish to look only at a certain type of garment or clothing, such as shirts, pants, sweaters, jackets, etc.; footwear, accessories, such as jewelry, etc. In other embodiments, the filter(s) may limit the items presented to the user by garment type as well as color and/or size; availability; etc. When the user sees one or more items of interest, they can select the items to see additional information. The methods described herein can also include a search feature to control the viewability, experience, and/or order in which items are displayed. For example, the user can slide content away or slide content to save. In alternative embodiments, the user could check a box or indicate interest using other known methods.

Examples of the type of the information provided to the user include, but are not limited to, location, price, size, availability, coupons or discounts, related or complementary information about the item, such as sustainable materials and manufacturing, interactive consumer experiences, and combinations thereof.

We claim:

1. A method of using multiple read area zones to generate more accurate item-level data on a shelf, the method comprising
   using a local area read device configured to detect an item having attached or affixed thereto a tags or labels comprising a digital triggers, scanning a first read area of the shelf and a second read area of the shelf, the first read area and the second read area being overlapping, and the first read area being smaller than the second read area,
   wherein the first read area is read using a first antenna mounted to the shelf and the second read area is read using a second antenna, and
   using the second antenna, detecting the digital trigger within the first read area that was not detected using the first antenna because the signal between the digital trigger and the first antenna is blocked.

2. The method of claim 1, wherein the digital trigger is selected from the group consisting of RFID, NFC, QR codes, and combinations thereof.

3. The method of claim 1, wherein the multiple read areas are used to generate X and Y coordinates of the item.

4. The method of claim 1, wherein the first antenna configured to read the first read area a faster response on exit or entry of the item from the first read area comprising a merchandising area than the second read area.

5. The method of claim 4, wherein the second antenna is configured to produce a read field that is higher in power than the read field of the first antenna, to utilizes a different type of RF read field than the RF read field of the first antenna, or combinations thereof.

6. The method of claim 4, wherein local area read device is configured to use the second antenna to have a lower perceived reaction time than the reaction time of the first antenna.

7. The method of claim 1, wherein the method further comprises implementing one or more additional read areas.

8. The method of claim 1, wherein the local area read device is configured to use a third antenna to use a third antenna to scan a third read area that comprises the first read area and the second read area.

9. A multiple read area zone system to generate more accurate item-level data, the system comprising a local area read device configured to detect an item having attached or affixed thereto a tag or label comprising a digital trigger, the local area read device having a first antenna mounted to a shelf and configured to read a first read area, the local area read device further having a second antenna configured to scan a second read area of the shelf, the first read area and the second read area being overlapping, and the first read area being smaller than the second read area, and
    wherein the local area read device is configured to detect a digital trigger in the first read area that was not detected using the first antenna because the signal between the digital trigger and the first antenna is blocked.

10. The system of claim 9, wherein the first read area and the second read area are the same area with dual functionality.

11. The system of claim 9, wherein the first read area and second read area are distinct and overlapping areas.

12. The system of claim 11, wherein the read area comprising the one or more first antenna is in close proximity to a merchandising area comprising an item and produces a fast response on exit or entry of the item from the merchandising area.

13. The system of claim 12, wherein the second antenna is configured to produce a read field that is higher in power than the read field of the first antenna, to utilize a different type of RF read field than the RF read field of the first antenna, or combinations thereof.

14. The system of claim 12, wherein the local area read device is configured to use the second antenna to have a lower perceived reaction time than the reaction time of the first antenna.

15. The system of claim 13, wherein the local area read device comprises a phased array of readers.

16. The system of claim 9, wherein the system further comprises one or more additional read areas.

* * * * *